United States Patent
Formo et al.

(10) Patent No.: US 9,491,181 B2
(45) Date of Patent: Nov. 8, 2016

(54) SOCIAL WEB OF OBJECTS

(75) Inventors: Joakim Formo, Åkersberga (SE);
Andreas Fasbender, Aachen (DE);
Marcus Gårdman, Skärholmen (SE);
Takeshi Matsumura, Kawasaki (JP)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 923 days.

(21) Appl. No.: 12/782,134

(22) Filed: May 18, 2010

(65) Prior Publication Data

US 2011/0161478 A1    Jun. 30, 2011

Related U.S. Application Data

(60) Provisional application No. 61/290,387, filed on Dec. 28, 2009, provisional application No. 61/292,967, filed on Jan. 7, 2010.

(51) Int. Cl.
*G06F 15/173* (2006.01)
*H04L 29/06* (2006.01)
(Continued)

(52) U.S. Cl.
CPC ............. *H04L 63/105* (2013.01); *H04L 67/12* (2013.01); *H04L 67/30* (2013.01); *H04L 67/303* (2013.01); *H04L 67/306* (2013.01);
(Continued)

(58) Field of Classification Search
CPC ... H04L 63/105; H04L 67/12; H04L 67/327; H04L 67/30; H04L 67/306; H04W 4/08; H04W 4/206; H04W 4/005
USPC ......................................................... 709/223
See application file for complete search history.

(56) References Cited

U.S. PATENT DOCUMENTS 5,884,029 A     3/1999 Brush, II et al.
7,200,804 B1 *  4/2007 Khavari et al. ............... 715/230
(Continued)

FOREIGN PATENT DOCUMENTS

CN   101179462 A    5/2008
CN   101308468 A    11/2008
EP     1646205 A1   4/2006

OTHER PUBLICATIONS

Salling Software [online] Sailing Media Sync [online] [retrieved on Jan. 26, 2011] retrieved from internet <http://www.salling.com/>.
(Continued)

*Primary Examiner* — Viet Vu
*Assistant Examiner* — Herman Belcher
(74) *Attorney, Agent, or Firm* — Patent on Demand, P.A.; Brian K. Buchheit; Scott M. Garrett

(57) ABSTRACT

According to exemplary embodiments, networked object management software, devices, systems and methods are described which use social mapping principles to streamline interactions between users and their networked objects, as well as between the networked objects themselves. Friendship relationships are established, by a network management system, between a plurality of the networked objects, each of the plurality of networked objects being associated with a use. When the network management system receives a task request, it can then assign the requested task to one of the plurality of networked objects which has a capability to perform the requested task and which also has an established friendship relationship with the user.

19 Claims, 14 Drawing Sheets

(51) Int. Cl.
*H04L 29/08* (2006.01)
*H04W 4/00* (2009.01)
*H04W 4/08* (2009.01)
*H04W 4/20* (2009.01)

(52) U.S. Cl.
CPC ........... *H04L 67/327* (2013.01); *H04W 4/005* (2013.01); *H04W 4/08* (2013.01); *H04W 4/206* (2013.01)

(56) References Cited

U.S. PATENT DOCUMENTS

| | | | |
|---|---|---|---|
| 2002/0187750 A1 | 12/2002 | Majumdar | |
| 2007/0192299 A1 | 8/2007 | Zuckerberg et al. | |
| 2007/0298813 A1* | 12/2007 | Singh | H04L 67/2804 455/456.1 |
| 2008/0114834 A1* | 5/2008 | Miyazaki | 709/204 |
| 2008/0114905 A1* | 5/2008 | Chen | H04N 5/76 710/16 |
| 2008/0252527 A1* | 10/2008 | Garcia | 342/450 |
| 2009/0210932 A1* | 8/2009 | Balakrishnan et al. | 726/5 |
| 2009/0247197 A1* | 10/2009 | Graff | H04L 29/12122 455/466 |
| 2009/0249429 A1* | 10/2009 | Sullivan et al. | 725/133 |
| 2010/0011361 A1* | 1/2010 | Millmore et al. | 718/100 |
| 2010/0161818 A1* | 6/2010 | Capuozzo et al. | 709/229 |
| 2010/0199218 A1* | 8/2010 | Farrelly | H04L 67/306 715/820 |
| 2010/0274815 A1* | 10/2010 | Vanasco | 707/798 |
| 2011/0078716 A1* | 3/2011 | MacWan | H04N 7/173 725/14 |
| 2011/0090529 A1* | 4/2011 | Hertling | 358/1.15 |

OTHER PUBLICATIONS

Simplify Media, [online] [retrieved on Jan. 26, 2011] retrieved from Internet <http://www.simplifymedia.com/>.
Apple, Apple—Airport Express—Features—Music Sharing, [online] [retrieved on Jan. 26, 2011] retrieved from Internet <http://www.apple.com/airportexpress/features/airplay.html>.
Apple, Apple—Run or workout with Nike + iPod, [online] [retrieved on Jan. 26, 2011] retrieved from internet <http://www.apple.com/ipod/nike/>.
Botanicalls, [online] [retrieved on Jan. 26, 2011] retrieved from internet <http://www.botanicalls.com/>.
Waldner, Jean-Baptiste (2007), Inventer l'Ordinateur du XXIeme Siecle. London: Hermes Science. p. 254 ISBN 274621560; [online] [retrieved on May 4, 2011] retrieved from internet <http://en.wikipedia.org/wiki/Internet_of_things>.
International Search Report mailed on Nov. 15, 2010 in corresponding International Application No. PCT/IB2010/001167.
Written Opinion of the International Searching Authority, mailed on Nov. 15, 2010 in corresponding International Application No. PCT/IB2010/001167.
International Preliminary Report on Patentability received from European Patent Office in corresponding International Application No. PCT/IB2010/001167 mailed Jun. 12, 2012.
First Office Action in corresponding Chinese Application 201080059813.8 issued Jul. 14, 2014.
Second Chinese Office Action in corresponding Chinese Application 201080059813.8 issued Mar. 26, 2015.

* cited by examiner

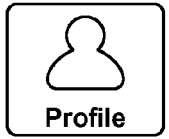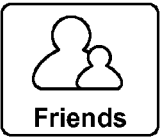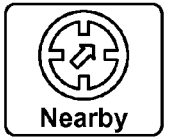

18

FPS:25

ThingNet

60 — News Feed | Notifications | Requests

Outdoor Thermometer 13 degrees now...
Twitter weather data 19:00 6.4°C 87 pct 1.3 m/s SW #wdisplay
47 days ago The House Toaster oven - Roasting cashews for the salad....mmmm....
(18.1kWh today / 3.05kW now) -
47 days ago Outdoor Thermometer 11 degrees now...
Live performance of 20 min live set by The Dead Weather: via
47 days ago Solar Panel Freshly installed today, now lets get the energy bills down....
53 days ago Outdoor Thermometer 11 degrees now...
Back at work. Pretty crappy weather outside, though. Sweden.....
55 days ago Home | Profile | Gather | Friends | Nearby

FIG. 3

SOCIAL WEB OF OBJECTS

RELATED APPLICATIONS

This application is related to, and claims priority from, U.S. Provisional Patent Applications Ser. Nos. 61/290,387 filed on Dec. 28, 2009, and 61/292,967 filed on Jan. 7, 2010, both entitled "A Social Web of Objects", the disclosures of which are both incorporated here by reference.

TECHNICAL FIELD

The present invention relates generally to networked systems and improving service therein and, more particularly, to systems, methods, devices and software associated with the management of networked objects based on social mapping principles.

BACKGROUND

The Internet has, in a decade, evolved into what is now the largest and most used digital network in existence. The Internet is a connection of computers using the TCP/IP protocol, using the so-called "World Wide Web" as a cognitive user interface to the Internet based on metaphors like "site", "page" and "link". The World Wide Web became something everyone could use largely because both utility and usability was provided by representing the Internet as two-dimensional graphical abstractions of linked pages. This paradigm efficiently explained the concept of Internet by using analogs that most people can understand.

The Internet continues to evolve further and could eventually also include a "physical internet" consisting of not only computers, but devices, other objects and environments with embedded data-, computation-, sensor-, location-, and communication-interaction capabilities. This potential evolution is often referred to using terminology such as "The Internet of Things", "Machine to Machine Communications", "Ubiquitous Computing", "Pervasive Computing" or "Ambient Intelligence". It has been estimated that every person is surrounded by somewhere between 1000 and 5000 intelligent objects and a global Internet of Things may in a few years consist of 50 to 100,000 billion objects whose location and status will have to be continuously monitored or updated. While the concept of such an Internet of Things may seem simple, its implementation will be far more difficult.

For example, many of today's products which link or connect networked devices are ad-hoc solutions that enable specific limited functionalities or services. Examples include file sharing and remote access software that runs on a device or computer and enables remote control and/or makes data or service accessible within a WAN, (W)LAN and/or PAN. Examples of such products include Salling Clicker, Simplify Media, Apple's Airtunes and iTunes Remote for the iPhone, etc. Another category of relevant products includes devices that collect and transmit data, such as products like the wireless pedometer "Nike+Apple" that measure parameters associated with a person's running, and Botanicalls, which is a sensor that communicates the level of humidity of the soil in a flowerpot to the web.

However, none of today's solutions for networked object interconnectivity provide holistic and unified interaction with a plurality of networked objects, environments, media and/or services based on the interrelations between them. Consequently there is no solution today that provides an intuitive way of understanding the contexts, relationships, ownership, compatibility, history, metadata, status, and dependencies of large numbers of objects that also may or may not be physically present. In addition there is no solution today that successfully supports the users' weak conceptual understanding of digital networks as such, i.e. the mental model of possible interactions and simultaneous interconnectivities within a digital network consisting of numerous devices and/or services.

Accordingly, it would be desirable to provide systems, methods, devices and software associated with the management and interconnectivity of networked objects which overcomes the afore-described challenges by addressing, among other things, ownership association, policy control, software and service management, error handling and maintenance of such networked objects.

LIST OF ABBREVIATIONS

API Application Programming Interface
AS Application Server
DLNA Digital Living room Network Alliance
NFC Near Field Communication
PN Personal Network
SLA Service Level Agreement
WAN Wide Area Network
(W)LAN (Wireless) Local Area Network
UPnP Universal Plug and Play

SUMMARY

The following exemplary embodiments provide a number of advantages and benefits relative to existing network object management software, devices, systems and methods including, for example, using social mapping principles to streamline interactions between users and networked objects, as well as between the networked objects themselves. It will be appreciated by those skilled in the art, however, that the claims are not limited to those embodiments which produce any or all of these advantages or benefits and that other advantages and benefits may be realized depending upon the particular implementation.

According to an exemplary embodiment, a method for managing networked objects includes the steps of establishing, by a network management system, friendship relationships between a plurality of the networked objects, each of the plurality of networked objects being associated with a user, receiving, at the network management system, a task request, and assigning, by the network management system, the requested task to one of the plurality of networked objects which has a capability to perform the requested task and which has an established friendship relationship with the user.

According to another exemplary embodiment, a management device which manages a plurality of networked objects based on friendship relationships with a user or with other networked objects includes a memory device configured to store a plurality of system entity profiles for each of the plurality of networked objects which has a friendship relationship with the user or other networked objects, the system entity profiles including an address for a respective networked object, an indicator of a level of friendship of the respective networked object with other system entities, and information associated with at least one capability of the respective networked object, an interface configured to receive task requests either directly from the user or via one of the plurality of networked objects, and a processor configured to assign requested tasks to networked objects which have a friendship relationship with the user or other networked objects based on the stored system entity profiles.

According to yet another exemplary embodiment, a system for managing networked objects includes a plurality of networked objects, each capable of performing at least one task, a gateway (GW) connected to each of the plurality of networked objects for sending task requests to and receiving task requests from, the plurality of networked objects, and an application server (AS) to which the GW maintains a connection and which manages friendship relationships among the plurality of networked objects and coordinates management of the task requests based upon the friendship relationships.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 3 shows an exemplary user interface which can be used in accordance with an exemplary embodiment;

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

According to exemplary embodiments, systems, methods, devices and software (computer programs) for management of, and interaction with, networked objects are based on social mapping principles. Such exemplary embodiments provide for holistic management of a plurality of networked objects including, for example, electronic devices, sensors, computers, services and users. Moreover, exemplary embodiments provide a presentation layer where each networked object is represented by a unique and identifiable profile that contains information about each object's system characteristics. By making the relationship between networked objects, as well as relationships between networked objects and users, analogous to, e.g., social mapping principles like "friendship" (i.e. a notion of trust or ownership relationship and access control), exemplary embodiments make objects' relations intuitive to understand for the users. Exemplary embodiments utilize a recognizable resemblance to a social network in order to enable users to form a holistic mental model of potentially large numbers of networked nodes with simultaneous interconnections and interrelations with each other.

Figure 1:
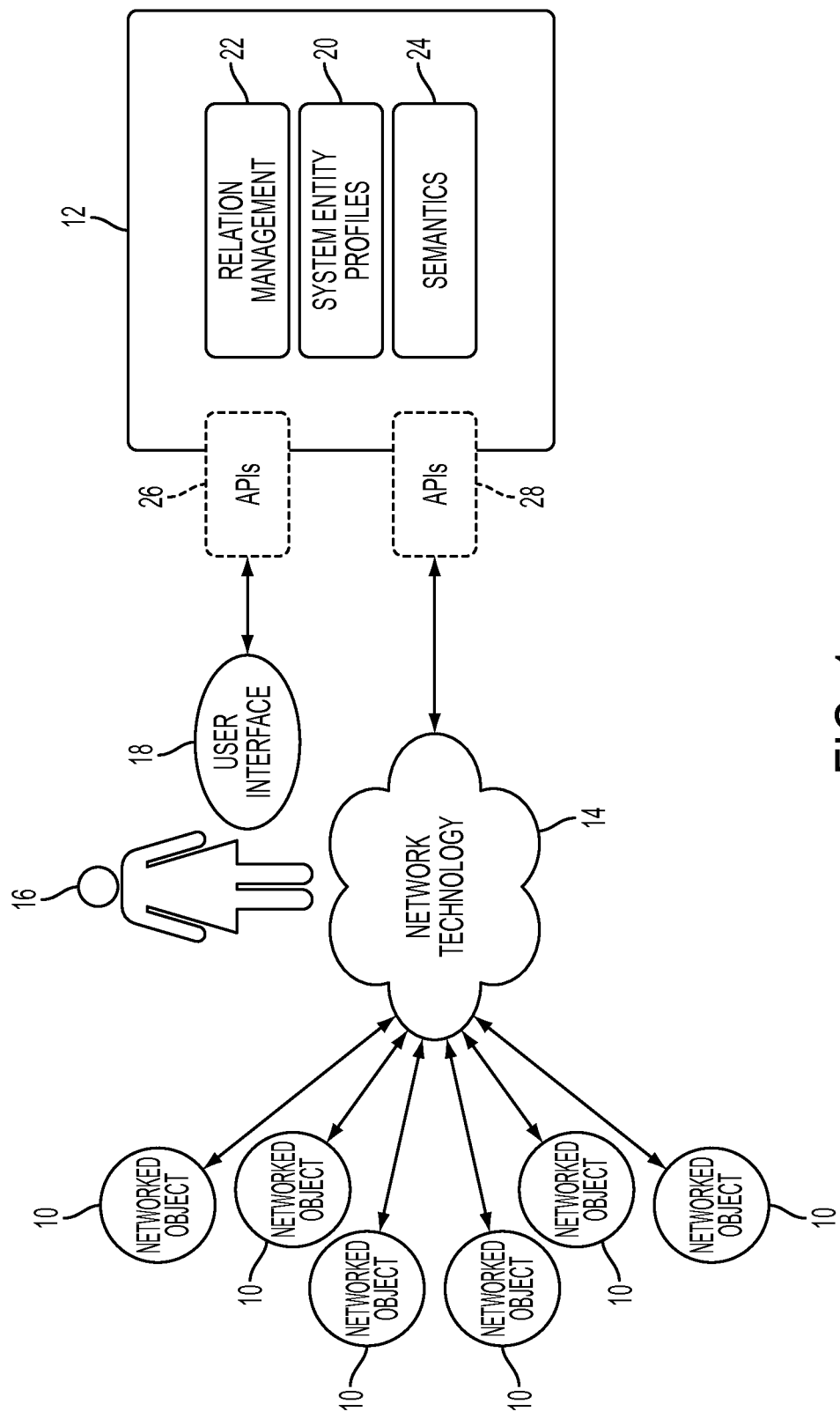
FIG. 1 illustrates a plurality of networked objects managed by a system according to an exemplary embodiment.

Prior to discussing detailed signaling mechanisms which facilitate such networks of objects according to exemplary embodiments, a high level architectural view of the system followed by several examples will be described with respect to FIGS. 1 and 2 to provide more context for the reader regarding the resulting systems as they can be experienced by users. Starting with FIG. 1, the system architecture at a high level according to exemplary embodiments is illustrated. Therein, a plurality of networked objects 10 is connected to the system 12 via a variety of network technologies 14, e.g., the Internet, a WAN, etc. The users 16 can access the services provided by the system 12 via user interfaces 18 whose implementation which will vary depending upon, for example, the context and the end user device on which the particular user interface 18 is running, e.g., mobile devices, computers, laptops, televisions or other devices.

The system 12 which manages the networked objects 10 can, for example, be implemented, at least in part, as server-based software. Persons that are using the system 12, i.e., the users 16, are represented and identified as entities in the system 12 by unique user profiles in the system. The networked objects 10 can also be represented and identified in the system 12 by unique profiles. Networked objects 10 include, but are not limited to: consumer electronics, digitally tagged objects, computer devices, mobiles, sensors, buildings, vehicles or even companies, brands, services and physical locations. Both the profiles that represent users 16 and network objects 10 in the system 12 are jointly referred to herein as system entity profiles 20.

Data associated with the plurality of networked objects 10 and users 16 is received by the system 12. The system 12 creates system entity profiles 20 for each networked object 10 and user 16. The system entity profiles 20 may include, but are not limited to, information about name, technical specifications, manufacturer, capability, location, history and other metadata associated with the respective networked object 10 or user 16. According to exemplary embodiments it is also possible to aggregate multiple networked objects under a common profile, i.e., not all objects necessarily have their own individually unique IDs or system entity profiles 20 in the system. For example, if a user connects 20 location sensors at home this group of location sensors may be identified in the system as one home location sensor. This aggregation can be performed, for example, at the GW to the system 12 or in the backend system.

The system 12 also includes a relation management function 22 which coordinates the interactions between the networked objects 10 by applying social management principles, e.g., using the afore-described friendship analog. The system 12 issues queries, described in more detail below, in order to establish relationships between system entities 10 and 16 by, for example, sending a system entity's profile 20 to a potentially relevant system entity based on the profile data and network access credentials of the receiving system entity. A relationship is established by the relation management function 22 based on the confirmation from the user(s) 16 or the system entity itself, i.e. multiple system entities can establish relationships with a single system entity. System entities can share temporal and permanent relationships with other system entities. Many separated and simultaneous network sites can exist, and the information and communication can be, according to exemplary embodiments, limited to a specific group of system entities defined by their relationship to each other. There can also be temporal or permanent connections between system entities belonging to different network sites.

The semantics function 24 includes functionality that allows, e.g., device manufacturers, to establish devices with a brand-dependent semantic interaction language where applicable. For example, a Sony TV could communicate in 'Sony language' (e.g. 'like' other Sony devices or content, relate to Sony PS games or Sony brand etc.) Other semantic layers are also possible, see e.g., the toaster or solar panel examples in the user interface screen of FIG. 3 described below. Semantics can also be user-defined (e.g., reflecting a certain level of maturity in operating a device translating into complexity of the user interface). Additional semantic layers could also include, for example, types of jargon or even slang. The semantics function 24 can also provide a natural language translator/interpreter/generator, i.e., a mechanism which translates machine signals or languages into languages which are more meaningful to humans.

The system 12 may interface with its objects 10 and users 16 through a set of APIs 26 and 28 in order to establish relationships using social mapping principles and also to exercise those relationships in performance of various task requests. Different user interaction paradigms can be used in order to manage the query/confirmation procedure. A user 16 could for example confirm a relationship query transmitted to it by the relation management function 22 of the system 12 by pressing a button in a graphical user interface, or both the query and confirmation of a relationship between two system entities could be done in one operation by physically bringing together the objects, using NFC or a similar mechanism.

To better understand the usefulness of networking objects and users using social mapping principles according to an exemplary embodiments, consider the following usage scenario involving remote control of a television. Assuming that both the user 16 and a TV (one of the networked objects 10) have already been set up with the system 12 and are therefore represented by system entities with corresponding system entity profiles 20, the user 16 can for example send a task request, for example via user interface 18 and API 26 to the TV's system entity (operative within system 12) requesting the system 12 to record a certain TV program. The system entity in system 12 associated with the TV will accept and acknowledge this instruction, even if the TV is in fact not capable of recording anything itself if it has a predetermined type of relationship, e.g., is friends with, another networked object 10 which can perform the requested service.

For example, suppose that the system entity of the TV has a friendship relationship with the system entity of a video recorder. In this case, the system entity of the TV can take responsibility for the request from the user 16 and relay the command to the system entity of the video recorder, which could, for example, be a representation of a physical device, a software functionality in the system, or a service provided via the network. The networked object video recorder 10 will actually execute the job, i.e., which is essentially 'subcontracted' to it by the TV's system entity in system 12, and the user 16 will receive a confirmation from the TV's system entity (again via API 26 and user interface 18) that the requested task will be performed, and later on that it has been successfully completed.

As another example, consider an exemplary embodiment wherein a user buys a network attached storage device (NAS) for his or her home media repository. When the NAS is connected to the user's home LAN, the NAS is discovered via a predetermined procedure (e.g., UPnP, Bonjour, DLNA or a similar mechanism) and a notification about the new device is delivered to the system 12. The system 12 creates a system entity profile 20 for the new device and sends a request to the user's application interface 18, e.g., on his or her mobile phone, to accept (or reject) the connection of the system entity of the new device. Once the user confirms that the NAS is permitted to join the group of system entities present in his or her 'Social Web of Things', other devices (such as media players) that are already part of this friendship related group and have the capabilities to establish a service relationship with this device, can use the NAS as media source.

Figure 2:
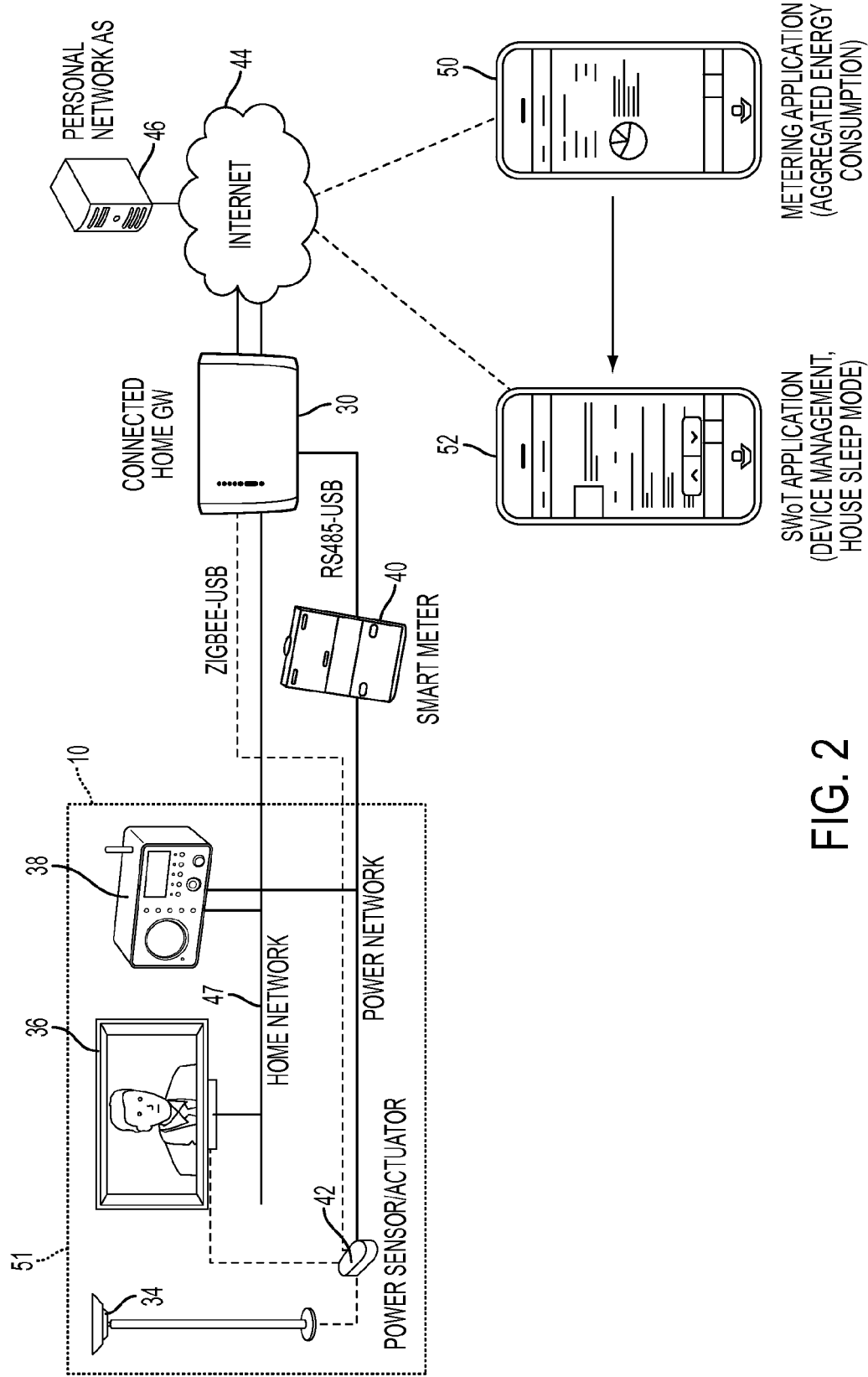
FIG. 2 depicts another plurality of network objects being managed in accordance with another exemplary embodiment.

Yet another example is illustrated in FIG. 2. Therein, the system 12 is, at least in part, implemented as a home gateway (GW) 30. In this example, the networked objects 10 include various power consuming devices including, e.g., a light, 34, a television 36, and a radio 38 which are connected both to the GW 30 and to a power network. In this context, a Personal Network (PN) can be considered to include a set of networked objects with which a particular user (or group of users, e.g., a family) has a relationship. A power meter 40 provides the GW 30 with information about power consumption on the network and one or more power sensor/actuators 42 can be used to monitor and/or control the networked objects 10.

The GW 30 is also connected to an outside network, e.g., the Internet 44, which enables it to communicate with an application server (AS) 46. This AS 46 can, for example, perform other functions of the system 12 described above if those functions are not performed in the GW 30. Alternatively, or additionally, AS 46 can perform other functions that are available to the owner/user associated with the network 47. Various external applications can also interface with the system via GW 30. For example, a metering application can be running on a user's device 50 to monitor and display the aggregated energy consumption associated with the devices at his or her home 51. Alternatively, or additionally, the user 16 can manage the devices 34, 36 and 38 via an application running on his or her mobile phone 52. More details associated with an exemplary gateway 30 and AS 46 which can be used to implement the exemplary embodiment of FIG. 2 are described below with respect to FIG. 6.

A more detailed, yet purely illustrative user interface 18 which can, for example, operate on a mobile phone or other end user terminal device and permit a user 16 to interact with the system 12 is shown in FIG. 3. Therein, a plurality of rows of items associated with a currently in focus News Feed tab 60 of the user interface 18 are shown, each of which provides, for example, information provided from a networked object 10. Other features (in FIG. 3 indicated as tabs), not currently in focus, can provide the user 16 with information relating to notifications from the system 12 related to networked objects 10 and requests, e.g., requests by a device to become a "friend" to the user and join the system entities associated with that user 16. Along the bottom of this exemplary user interface 18 are a number of selectable user interface elements including, for example, a "Home" element which returns the user to the presently viewed screen, a "Profile" element which enables the user 16 to access the system entity profiles 20, a "Gather" element which provides a mechanism for the user to interact with information aggregated from various networked objects, e.g., the total power consumption of devices in a household or the aggregated media base of a user from various media servers, a "Friends" element which, when actuated, lists the networked objects that have already established friend relationships with this user and a "Nearby" element which when actuated, displays information regarding networked objects that are near to the user's mobile phone or terminal device and their relationship to the user.

As mentioned previously, the system 12 according to exemplary embodiments can establish different hierarchical levels of relationship between the system entities which the system 12 manages using social mapping principles so as to be more user friendly and to make it easier for a user 16 to relate to the managed network objects 10. For example, a top level relation could be "the owner"; a relational description in the system when a person owns an object. A networked object 10 could have several owners. In some cases, a system entity associated with one networked object 10 or user 16 (i.e., a device or a persona) may need to have administrative rights, and be in control of access or use of, another networked object 10, even if the system entity is not the owner of that networked object. In this case, exemplary embodiments provide a relation designation referred to herein as "best friend", i.e., someone that is closer, has better access and more privileges than the level below; i.e., "friends". Networked objects may also be present in a system which do not have any of these preferred relationships with the users or other networked objects and a herein referred to as "strangers". Moreover, it will be appreciated that although three different levels of preferred relationships for networked objects are described above, that different implementations of these exemplary embodiments may use more or fewer such levels to implement social mapping principles for networked object management. A summary of exemplary relational descriptors and their associated functional characteristics is provided below in Table 1.

TABLE 1

| Relational Descriptor | Characteristics |
| --- | --- |
| Owner | The user or networked object which possesses this relational descriptor in a stored system profile relative to another networked object has administrative rights to configure that networked object as well as best friend access rights to that networked object. |
| Best Friend | The user or networked object which possesses this relational descriptor in a stored system profile relative to another networked object has the highest level of access rights (but no administrative rights) with respect to that networked object. For example, a user or networked object which is best friends with a particular networked object can expect to receive higher bandwidth/QoS priority for their task requests than other users or networked objects which have a less favored relationship, e.g., friends or strangers |
| Friend | The user or networked object which possesses this relational descriptor in a stored system profile relative to another networked object has the second highest level of access rights with respect to that networked object. For example, |

TABLE 1-continued

| Relational Descriptor | Characteristics |
| --- | --- |
| | as compared to users or networked objects which are considered to be strangers toward a given networked object, friends can accept task requests from other friends without requiring an owner or user to first authorize the request. Friends will have lower priority than best friends in terms of bandwidth and QoS with respect to task requests. |
| Stranger | The user or networked object which possesses this relational descriptor in a stored system profile relative to another networked object has no established relationship with that networked object. Tasks requests from a stranger may need to be authorized by an owner or user, or may be rejected outright. |

Relation management function 22 of system 12 establishes and manages these different levels of relationship between networked objects 10 and users 16. For example, networked objects 10 and users 16 (or networked objects 10 and other networked objects 10) which are designated as friends are interconnected and have reciprocal access to each other's information/data/functionality. Devices which are friends are set by the system 12 to help each other, execute requested tasks for each other and inform each other about their status, but according to exemplary embodiments they cannot administer each other. A 'friend' relation can have a temporal quality (e.g., rental car, hotel room, etc.) or may be permanent. The social mapping paradigm described above can be further extended to include additional levels which are easily distinguished by users, for example, 'friends of friends' or peripheral 'acquaintances'. Networked devices which have this latter relationship relative to other devices or users are not, according to some exemplary embodiments, directly connected with those other devices or users, but could, for example, be present in the form of their functionality or service they provide. The value of such relations as they are used in systems and methods which manage networked objects using social mapping principles according to exemplary embodiments is explained in more detail below.

Any system entity associated with system 12 can be aware of functionality provided by networked objects 10 with whom it has a predetermined relationship or level of friendship, e.g., the functionality of networked objects 10 which is managed by that system entity's best friends' friends. Consider the previously described example with the TV and the video recorder (e.g., VCR), in a scenario where the TV relays the task to the VCR, but the VCR for some reason was unavailable or incapable of executing the requested task (e.g., recording a TV program). In this case, the TV (or more precisely the system entity in system 12 which corresponds to the TV) may be aware of other options for performing the requested task, e.g., other networked nodes that have the needed capability but with which it may or may not have a direct friend relationship. If those other options are not directly available to the TV, it may be possible that such functionality could be made available to the TV utilizing the friendship relations of others to ask for a specific favor. For example, if the TV's owner/best friend (e.g., user/human 16 or networked object 10) has a friend that is connected to a system entity that can provide the functionality needed, the system 12 can send a message to that system entity requesting that, e.g., the requested program be recorded and stored.

To develop the latter exemplary scenario further, suppose that the TV (networked object 10) and/or its corresponding system entity in system 12 is aware that a friend (i.e., a person, in another household) of it's owner (and/or best friend) have the needed functionality in his or her network.

Then, the TV could be set to ask its owner if it is permitted to contact the owner's friend to ask for the needed favor (e.g., recording and storing a specific TV program). If the TV's owner's friend agrees to this, perhaps even based on predetermined criteria like remaining/maximum storage space and time, a device that is able execute the requested functionality could make this functionality available to the TV. Moreover, even if the TV in network A is not a friend of the recording device in network B (e.g., these two networked objects may not even 'see' each other through the network, but instead only transmit/request signals associated with the favor that is requested/provided) it may still be able to relay the task of recording of the TV program to the recording device in network B, possibly upon authorization from a system entity having a sufficiently high friendship relation with that recording device.

In order to provide the underlying signaling, logic and lower level architecture needed to accomplish these various scenarios which use social mapping principles applied to managed networked objects, a personal networking (PN) architecture can be used as will now be described with respect to FIGS. 4-6 below. However it will be appreciated by those skilled in the art that other types of lower level architecture than those described below could be used instead to accomplish the higher level functionality described above in accordance with FIGS. 1-3. According to these exemplary embodiments, a PN architecture shown generally in FIG. 4 connects consumer devices (sometimes called Personal Network Entities, PNEs, herein or networked objects 10 as described above) that reside in a local network; through gateway devices (PNE Cluster Gateways) to server-side enablers (Personal Network Application Server, PNAS) and from there optionally to $3^{rd}$ Party Service and Content Providers. Note, however, that the PNE cluster gateways can be implemented as physical, standalone nodes or, alternatively, as logical functions which are physically implemented on one or more of the networked objects themselves. In the latter case, networked objects may not need to communicate via GW devices per se.

Therein, the cluster layer 80 is the lowest layer, where services are not under control of the PN system according to this exemplary embodiment. A PNE Cluster, e.g., cluster 82, includes a set of devices and a PNE Cluster Gateway (e.g., as shown in FIG. 2) where the gateway communicates with the devices locally. A PNE Cluster 82 also includes the services that are hosted by the devices and the PNE cluster gateway, e.g., gateway 30 in FIG. 2. Each PNE Cluster 82 is assumed, according to this exemplary embodiment, to communicate over a gateway and is hence identifiable and addressable via this gateway. A PNE Cluster Gateway communicates with the PNAS over wide-area networks and with devices within the PN Cluster 82 over local access networks. A PNE device or networked object 10 may be part of two or more PNE Clusters 82. A service in this cluster layer 80 may be provided in a non-personalized way, as for example a DLNA service including services provided locally by a device and services provided by a $3^{rd}$ Party. Services in this layer are directly accessible from the PNE Cluster Gateway.

Figure 4:
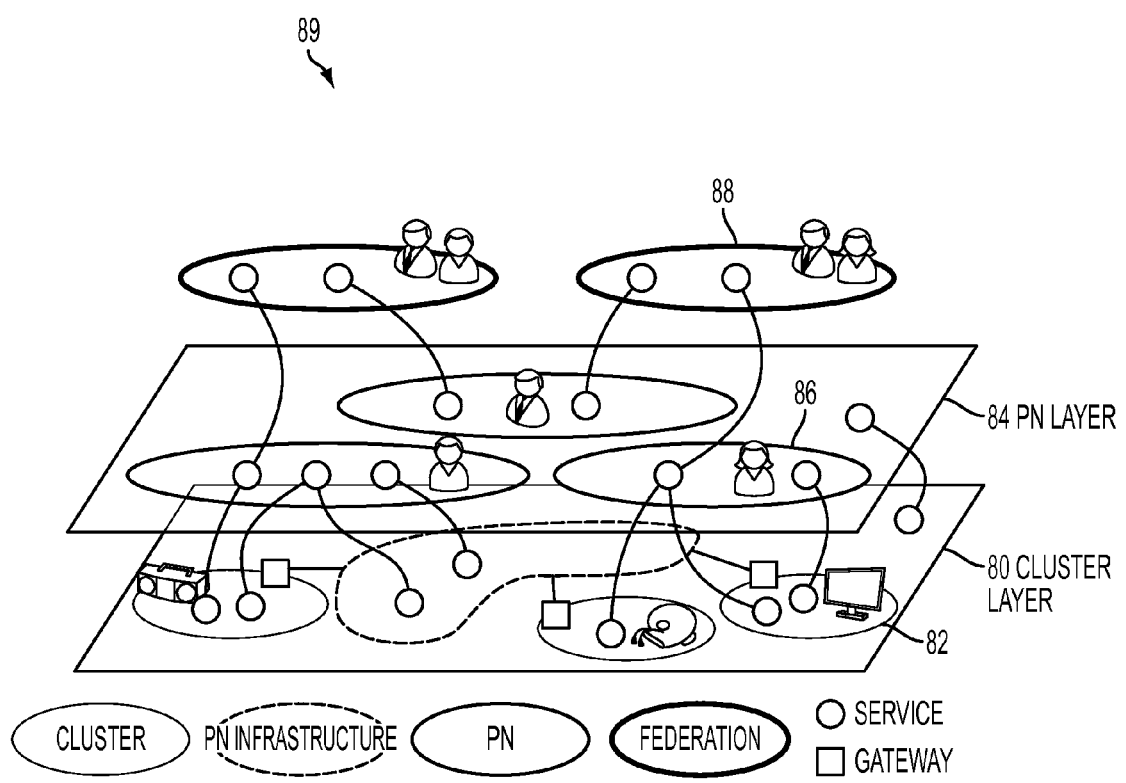
FIG. 4 illustrates an exemplary layered architecture which can be used in accordance with an exemplary embodiment.

Moving up in the hierarchy of layers shown in FIG. 4, the PN Layer 84 manages services that are under control of the PN system. According to this exemplary embodiment, the PN system is responsible primarily for device and service management in PNs, management of users and association to PNs, authentication and authorization of a service requester, filtering on the context information exposure, and management of watchers on the events in PNs. A Personal Network (PN) 86 can be defined as an overlay network consisting of one or multiple PNE Clusters 82. A PN 86 is assigned to a single PN user who is called the PN owner in this exemplary embodiment. A PN 86 enables the owner to consume a service within the PN regardless of the cluster in which the service exists, e.g., as described above using friendship relations. The PN owner may consume a service provided by a $3^{rd}$ party or by other PNs by a device in the PN. PN 86 also enables the owner to expose the devices and services within the PN to $3^{rd}$ party Service Providers and consumers in a controlled way, managing for example access restriction, privacy protection and service abstraction from the devices, e.g., by using the social mapping conventions described above with respect to FIGS. 1-3. A service in this PN layer 84 may access context information aggregated within the PN, for example for service personalization. The PN architecture assumes that each device, service, PNE cluster, and the PN is identifiable and addressable.

Services from different PNs may form an overlay service network called a PN federation 88. A PN federation 88 facilitates sharing of devices and services among multiple PNs 86, while privacy and security can be maintained across the whole PN federation 88. Thus, the PN Federation Layer 89 provides a mechanism for grouping PN services and service requesters under a single federation policy. Each PN 86 taking part in a PN Federation 88 can have its own policies to control what devices and services in the PN are made available to the other PNs in the PN Federation. In other words the set of devices and services available in a PN Federation is not always equal to the set of all devices and services in the participating PNs.

Figure 5:
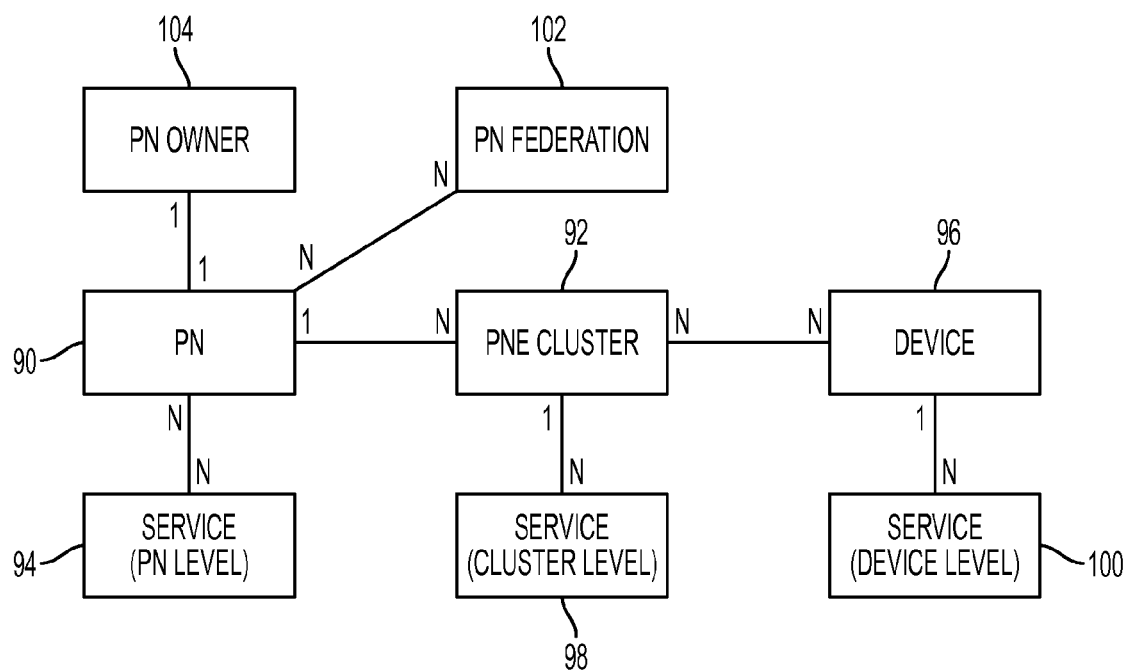
FIG. 5 shows exemplary relationships between architectural elements in accordance with an exemplary embodiment.

FIG. 5 shows an exemplary relationship among the different entities described above with respect to the exemplary embodiment FIG. 4, e.g., which entities relate to other entities in either a 1:1 relationship or a 1:many (N) relationship. Therein, one PN 90 can include multiple PNE Clusters 92 and PN-level Services 94. One PNE Cluster 92 can include multiple devices 96 and Cluster-level services 98. A device can include multiple device-level services 100. It will be appreciated that as used in this context, N can be a number which is equal zero or be a number which is greater than zero. A PN 90 can belong to N PN Federations 102, which in turn can include N PNs 90. As mentioned above, a PN owner 104 typically has a one to one relationship with his or her own PN 90. The services 94, 98 and 100 illustrated in FIG. 5 typically can be categorized as shown below in Table 2.

TABLE 2

Service Types

| Type | Description | Example |
| --- | --- | --- |
| PN level | A service that is associated with a PN and is not a cluster level service. | A VoD service that the user has associated his PN to consume the service by a specific device in the PN. A composite service that utilize services provided by clusters. |
| Cluster level | A service that is provided by a PNE cluster gateway | A composite service to control a DLNA device according to a room occupancy sensor. |
| Device level | A service that is provided by a device | Media Renderer service of DLNA device |
| External | Service that is provided by an external entity | Google Map |

Regarding the identities of the various entities described above with respect to FIGS. 4 and 5, the identity of a device 96, i.e., a networked object 10, can be for example provided by the device manufacturer, e.g., a MAC address. However, device identities could also be provided in other ways, e.g., on an IP level by a home DNS service or using explicit names, e.g., entered into the system by user configuration. Device-level services 100 are identifiable inside the respective device 96, which means that the cluster-level service is able to identify the device level service 100 by using a combination of the device 96's identity and the identity of the device level service 100. The identity of a cluster-level service 98 identifies the service uniquely within the cluster. In conjunction with the PNE cluster 92's identity, a PN level service 94 is able to identify the cluster-level service 98. The identity of a PN-level service 94 identifies the service uniquely within the PN 90. In conjunction with a PN 90's identity, service requesters are able to identify a PN-level service 94 if there is an SLA in place between the PN and the service requesters.

Figure 6:
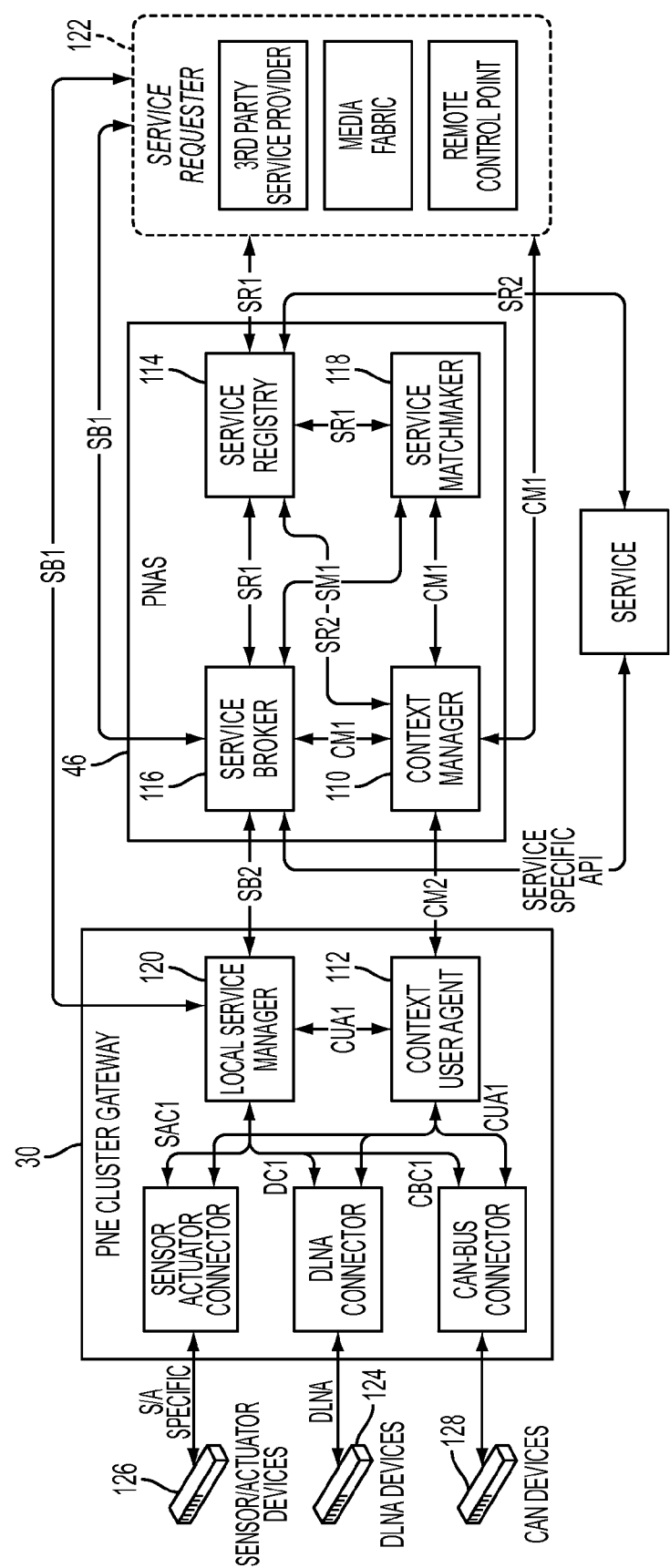
FIG. 6 illustrates a more detailed architectural schematic for implementing management of networked objects using social principles according to an exemplary embodiment.

FIG. 6 provides a more detailed architectural view of a gateway 30, an associated PN AS 46 and their interactions with a service requester according to an exemplary embodiment which can be used to jointly provide management of networked objects using social mapping principles. Table 3 below provides a brief description of each of the logical interfaces illustrated in FIG. 6.

TABLE 3

Short description of each logical interface

| Interface | Owner | Description |
| --- | --- | --- |
| CM1 | Context Manager | PN enablers and any 3$^{rd}$ party may retrieve and update the PN context information. |
| CM2 | Context Manager | The Context User Agent uploads to the Context Manager the context information generated in the cluster, and it downloads the entire or a part of the PN context information from the Context Manager when necessary. |
| SB1 | Service Broker | The Service Requester invokes services in the Service Broker. |
| SB2 | Service Broker | The Service Broker invokes a service in the Local Service Manager. |
| SR1 | Service Registry | 3$^{rd}$ party SPs or PN enablers query for the registered services in the Service Registry. |
| SR2 | Service Registry | 3$^{rd}$ party SPs or PN enablers register services in the Service Registry |
| SM1 | Service Matchmaker | PN enablers request service matchmaking and receive the result. |
| CUA1 | Context User Agent | Connectors and services in the Local Service Manager request population and retrieval of the context information. |
| SAC1 | Sensor Actuator Connector | Services in the LSM invoke services on the Service Actuator Connector |
| DC1 | DLNA Connector | Services in the LSM invoke services on the DLNA Connector |
| CBC1 | CAN Bus Connector | Services in the LSM invoke services on the CAN Bus Connector |

As seen in FIG. 6, context management is provided in order to determine device capabilities, friendship relations and user situations to, in turn, be able to make intelligent adaptations of the media delivered in response to a service request. These adaptations can range from selection of variants (e.g., low-res thumbnails to mobiles; hi-res widescreen to HDTV's, hi-res with interaction to users who have a mobile phone and a TV at the same time) to various types of transcoding, including content adaptation (i.e. personalization). A PN 90 according to exemplary embodiments is associated with context information where the information related to the devices and services in the PN are stored. Context Management is the function according to exemplary embodiments that aggregates the context information from each cluster in the PN 90 and exposes it to a context consumer. Service Providers, Content Providers and end users are context consumers. The Context Management function authenticates and authorizes accesses to the context information and filters the information to be exposed so that the end user and the operator can control the information to be exposed.

More specifically, a context manager 110 is provided in the PN AS 46 (and counterpart context user agent 112 in the gateway 30). According to exemplary embodiments, there are two approaches to process context information. One is to store the information in the original format provided by each device standard and to require that any context consumers understand this format. The alternative is to store the context information using a unified model. The latter has an advantage in that it enables the context manager 110 to generate comprehensive context information based on the elementary information from different types of devices such as DLNA devices 124, sensor/actuator devices 126, and CAN devices 128, while the former enables utilization of existing standards as much as possible. In either implementation, context management implies interacting with database-backed systems. Thus, according to one exemplary embodiment, the context management system 110, 112 contains the following databases:

1. A device capability database (e.g., defining what type of media a PS3 can handle or which media formats and streaming protocols are supported by a iPhone 3.0). This database typically needs to be manually populated primarily because it is difficult to automatically derive this information, the database typically only needs to be created once, and typically can be created by the manufacturer (e.g., referenced by the device, in the same way as UAProf).

2. A service required capabilities database which describes what a service would require to be meaningfully consumed. This database typically is also created only once, by the service provider (or a proxy for the service provider, like the operator).

3. A database or list indicating which devices and user-provided services are available in particular user situations, also known as the "personal network" (this data structure can typically be populated automatically, e.g., via a discovery process, at least in the DLNA-case) and to which of the device types and situational parameters those services match. This data structure may be updated seldomly (e.g., when a device is "paired" or "discovered") and can be created by the gateway 30.

4. A database or list indicating what the other parameters of the situation are, e.g., sensor readings which are semi-persistent, such as the location. This data structure can, for example, be updated several times of day and can be created by the gateway 30 or by the operator and attached to the database representation (in the case of location, for instance).

5. A database, list or other data structure indicating the current status of a particular device or personal network (e.g., if the PN has the same constraints throughout, and can be represented by the PNE Cluster GW). Current bandwidth and other situational parameters, such as ambient temperature, light level, physical orientation, etc. can be stored in this data structure which will get updated relatively often, e.g., by the gateway 30.

This data enables the gateway 30 and/or the PN AS 46 according to exemplary embodiments to intelligently adapt service provision as described above in the exemplary service request scenarios which involve "friend" devices or, more generally, task requests which involve networked objects having at least a predetermined relationship level in a given hierarchical implementation of relationship levels. Note that not all of this information is necessary to every application or service request. Thus, the application of service which needs the information can query the databases containing this information (which may or may not be present at the same location, e.g., in the same operator database). Alternatively, there can be a proxy provided for the information which is queried. The latter approach has several advantages, for instance the ability to integrate with existing systems (e.g. XDMS) very easily; and the user can determine a policy for what is delivered to whom. The query itself can take various forms, for instance, a SPARQL or XQUERY query; a web services document submitted to a URL (REST or SOAP-wise), an ISC request, etc.

In addition to context management in support of networked object management employing social mapping principles, various functions in support of service management are also shown in FIG. 6. Therein, the exemplary PN architecture enables a PN owner to expose services from his or her PN so that they are accessible by a service requester such as a service provider, a contents provider and end users other than the PN owner. The exposed service may be described in a device-independent way, which makes it possible for the PN owner to decide by which device he wants to receive the service. The exposed service may require certain capabilities on the service consumers so that an inappropriate device or application is not proposed to the PN owner as a consumer of the service. For example, when a media rendering service exposed by a PN invokes a request for rendering a video or audio clip, the PN owner receives a notification with a list of candidate devices that are located nearby and are capable of consuming the given media, enabling the user to choose which device to use.

Hence, the Service Management function in the PN architecture of the exemplary embodiment of FIG. 6 mediates between the Service Requester and the user, keeping the balance between fine-grained service delivery and protecting the user's privacy. In this example, the Service Management function includes the Service Registry 114, the Service Broker 116, the Service Matchmaker 118 and the Local Service Manager 120. The Service Registry 114 is the single point of contact for other PN enablers or a Service Requester 122 to find the requested service. The Service Broker 116 and the Local Service Manager 120 host services that are accessed by a Service Requester 122. The Service Matchmaker 118 compares the requirement of the services in the Service Registry 114 with device capability and other context information of the PN, and the matched service and device pairs are stored in the context information of the PN. A Service may be a composite service which looks up other services in the Service Registry 116, executes them and aggregates the results. A constituent service of a composite service may be a service provided by a service provider or a service provided by a PN.

Each PNE cluster 92 has a (and, according to some exemplary embodiments, only one) PNE Cluster Gateway 30 which collects information from the devices 10 in the cluster, such as statuses, service information and event occurrences, and forwards this information to the Context Management function. The Service Management function receives requests for services provided by the devices in the cluster or the PNE cluster gateway itself, dispatches the requests and collects the results to be returned to the Service Requesters 122.

Figure 7A:
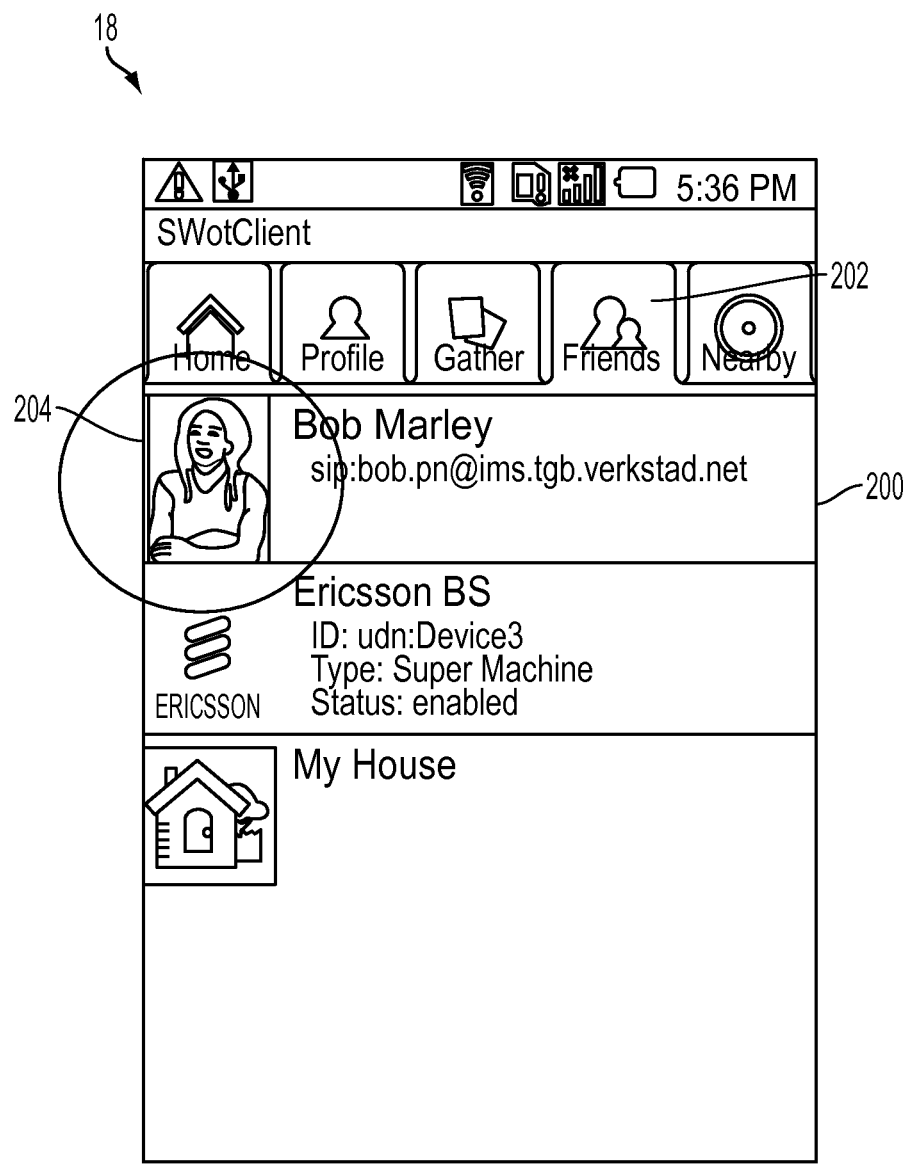
FIGS. 7(a)-7(c) show user interfaces associated with other exemplary embodiments.
Figure 7B:
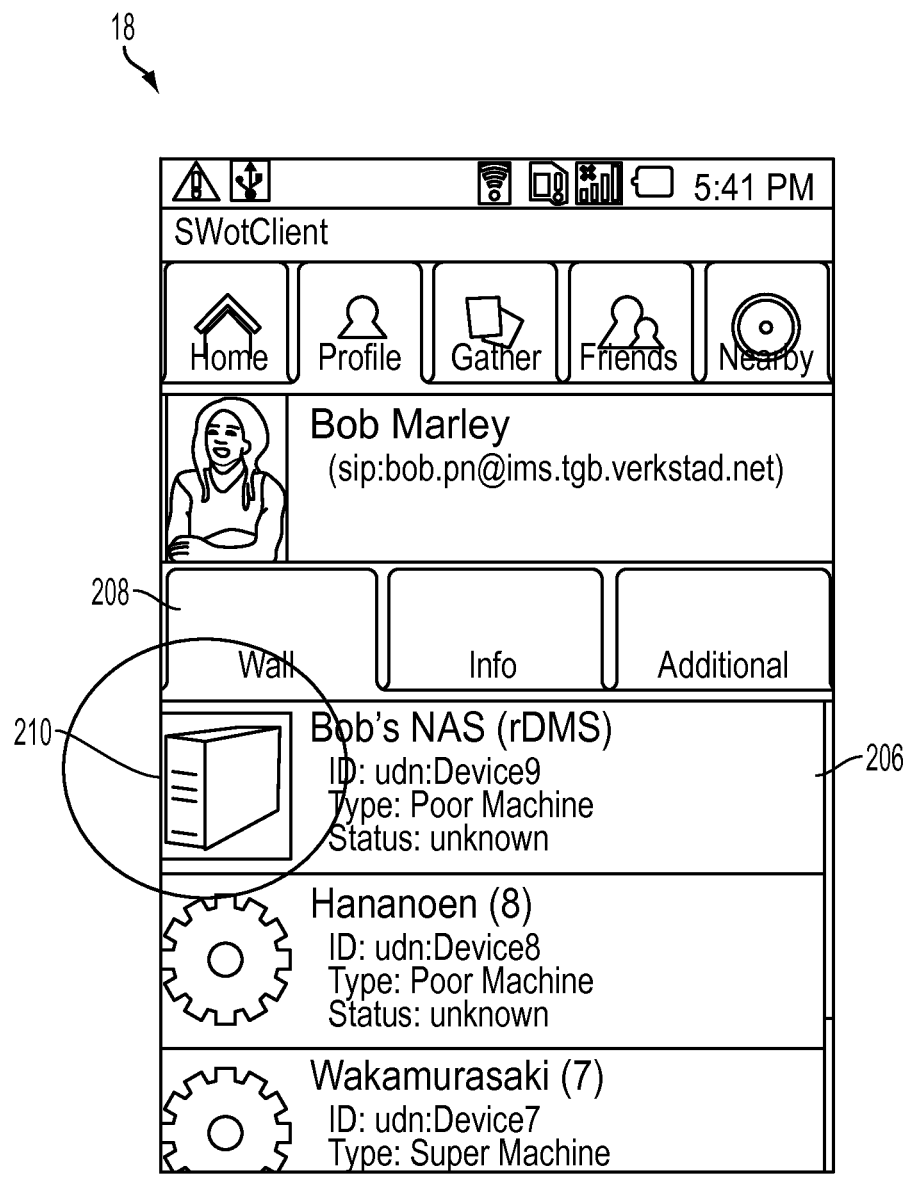
Figure 7C:
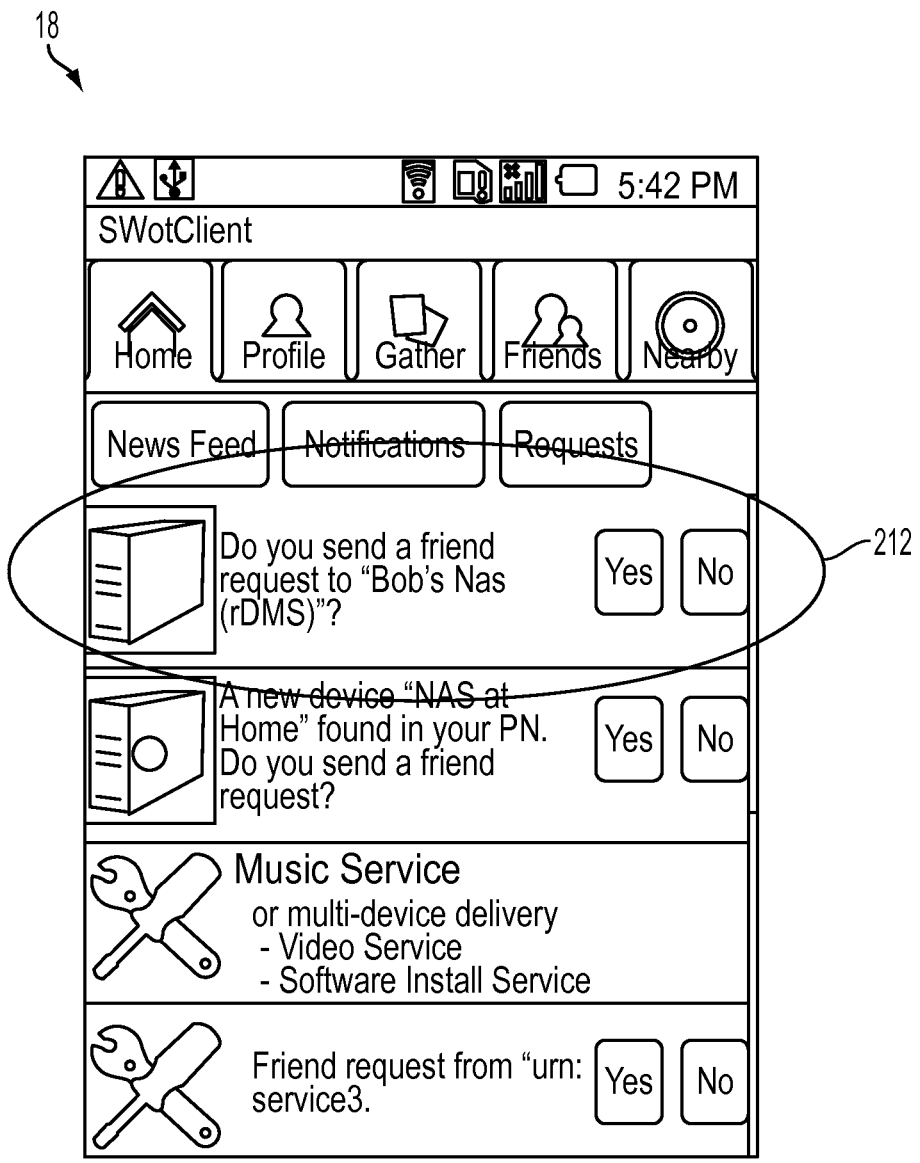

Using the architecture described above with respect to FIGS. 4-6, the aforedescribed management of networked object using social mapping principles can be implemented. Another example of such interactivity will now be described with respect to the user interface screens associated with a user interface 18 shown in FIGS. 7(a)-7(c). Starting with user interface screen 200 in FIG. 7(a), a user 16 (Alice) of a PN 90 can see another user 16 (Bob) in her friend list (displayed by actuating Friends tab 202) because Bob and Alice are mutual friends. By clicking on Bob's icon 204, Alice can further check Bob's networked object information as shown in FIG. 7(b). Therein, an entry 206 associated with Bob's NAS appears in the wall 208 since devices and services owned by Bob which have been designated by Bob as having an "open" setting can be seen by his friends, hence Alice can see Bob's NAS on the wall 208. By clicking on (or otherwise selecting) the icon 210 associated with Bob's NAS, Alice is prompted by the SWoT UI to be friends with Bob's NAS as seen in FIG. 7(c). Alice is guided to the notification tab under the home page, and sees that she receives a notification 212 saying "Do you want to send a friend request to "Bob's NAS"? According to this example, suppose that Alice selects "Yes" as she is interested in being able to access the device, e.g., to enable her to access Bob's NAS to search for interesting media content. This message will then be relayed to the relation management function 22 to establish the friend relationship between Alice and Bob's NAS device as described above. Alternatively, an explicit request by Alice to access Bob's NAS could be treated as an implicit request to establish a friend relationship with Bob's NAS, which could then be accepted or rejected by Bob.

Figure 8:
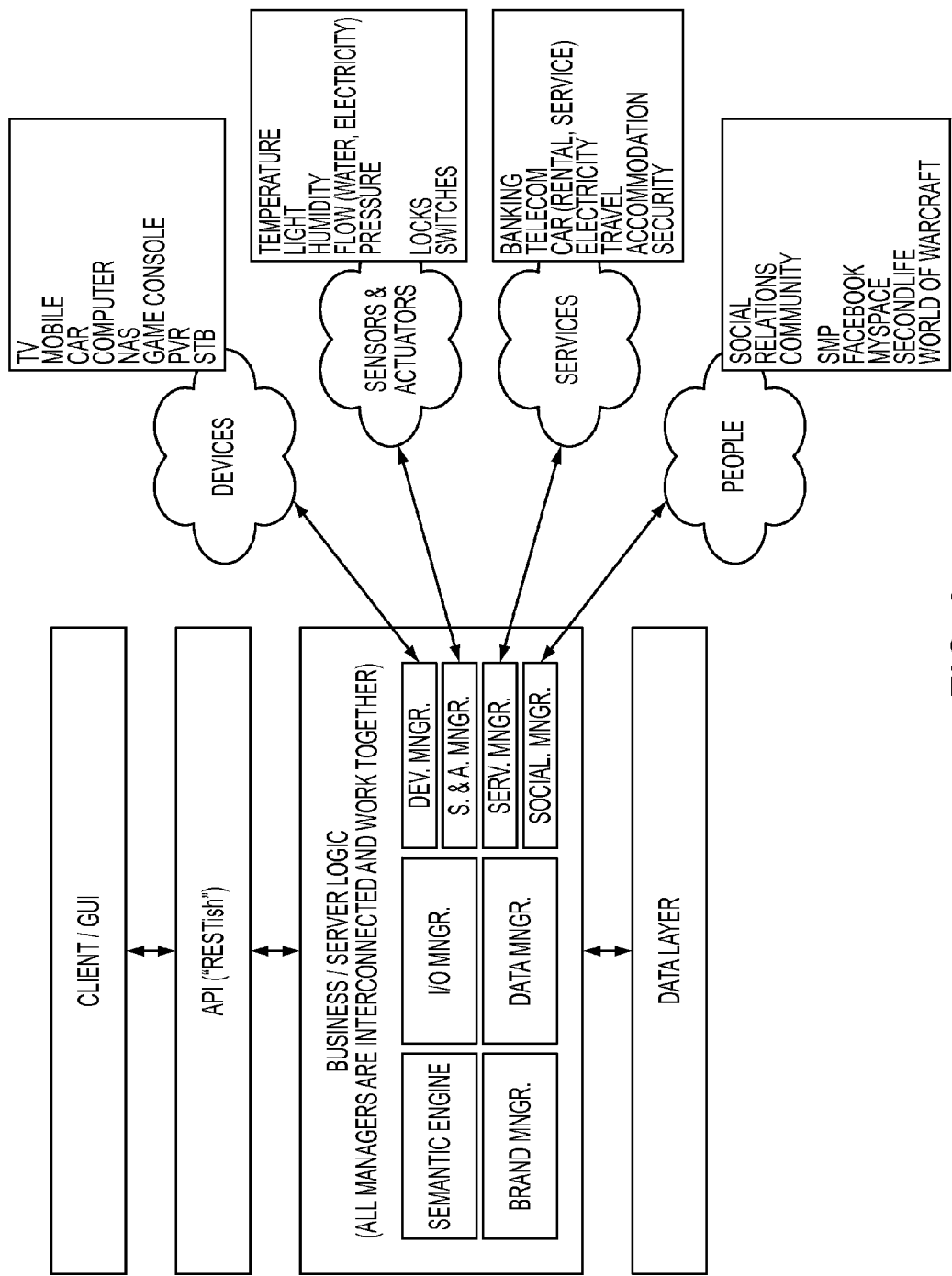
FIG. 8 depicts another architecture for providing management of networked objects using social mapping principles according to an exemplary embodiment.

FIG. 8 depicts another high level view of architectures associated with managing networked objects using social mapping principles according to exemplary embodiments, including a number of examples of devices, sensors and actuators, services and people that may be associated with such management systems and methods. From the foregoing description, it will be appreciated that devices and servers are involved in implementing such systems. By way of example, rather than limitation, an example of a (mobile) device 700 and a server 600 will now be described with respect to FIGS. 9 and 10, respectively.

Figure 9:
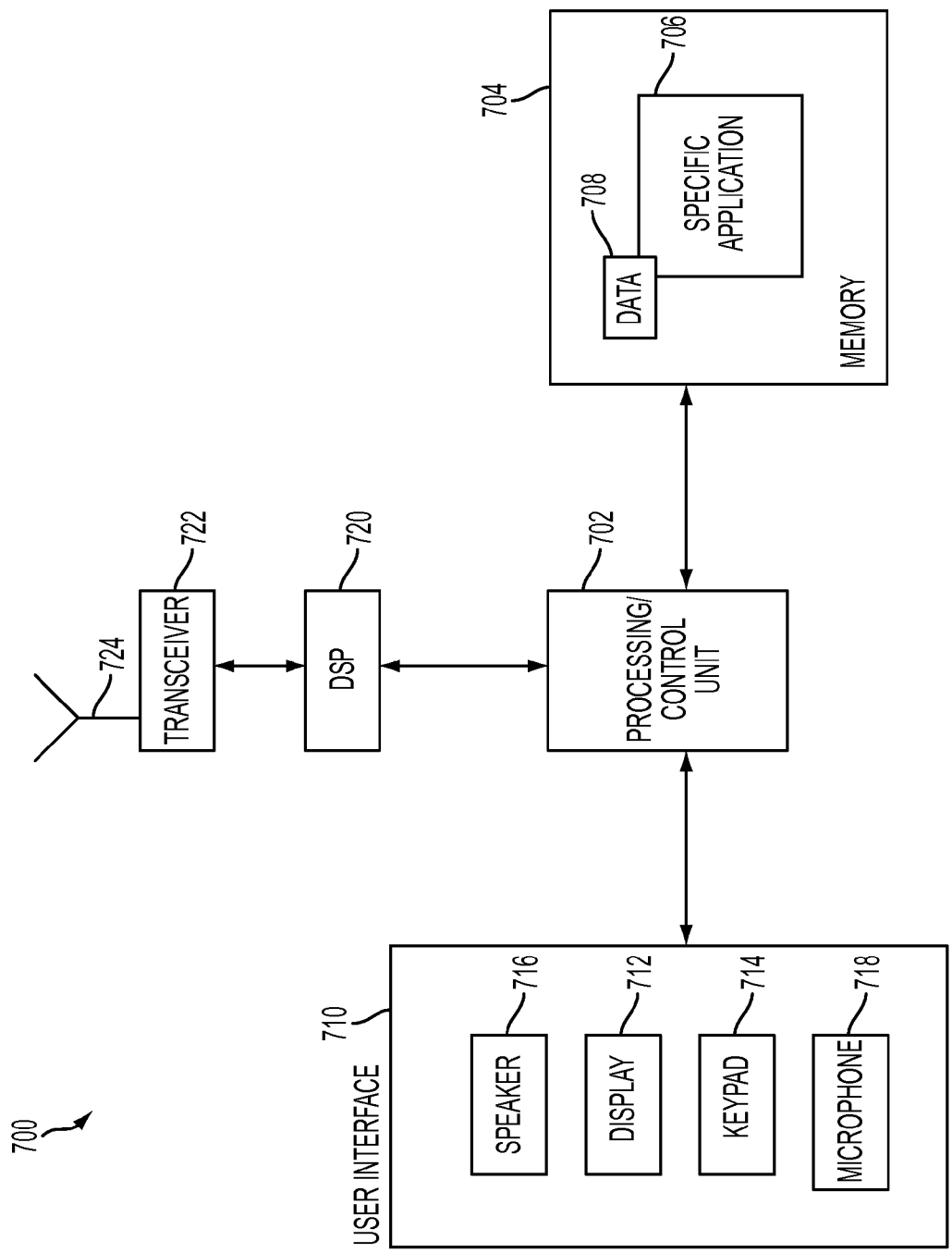
FIG. 9 illustrates an exemplary mobile device which can be used in conjunction with exemplary embodiments.

Starting with FIG. 9, an exemplary networked object or terminal device which runs user interface 18 can be a mobile device such as the exemplary mobile computing arrangement 700 which may include a processing/control unit 702, such as a microprocessor, reduced instruction set computer (RISC), or other central processing module. The processing unit 702 need not be a single device, and may include one or more processors. For example, the processing unit 702 may include a master processor and associated slave processors coupled to communicate with the master processor. The processing unit 702 may control the basic functions of the networked object or mobile terminal as dictated by programs available in the storage/memory 704. Thus, the processing unit 702 may execute the functions described above to, e.g., enable friend devices to communicate with one another. More particularly, the storage/memory 704 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the mobile computing arrangement 700 via data signals, such as being downloaded electronically via a network, such as the Internet.

One of the programs that may be stored in the storage/memory 704 is a specific program 706. As previously described, the specific program 706 may be a client application which interacts with the system 12 to, for example, receive and authorize friend requests, send task requests and receive task results, or display information about networked objects 10 with which the user has a friend, best friend or owner relationship. The program 706 and associated features may be implemented in software and/or firmware operable by way of the processor 702. The program storage/memory 704 may also be used to store data 708, such as the various authentication rules, or other data associated with the present exemplary embodiments. In one exemplary embodiment, the programs 706 and data 708 are stored in non-volatile electrically-erasable, programmable ROM (EEPROM), flash ROM, etc. so that the information is not lost upon power down of the mobile terminal 700.

The processor 702 may also be coupled to user interface 710 elements associated with the mobile terminal. The user interface 710 of the mobile terminal may include, for example, a display 712 such as a liquid crystal display, a keypad 714, speaker 716, and a microphone 718. These and other user interface components are coupled to the processor 702 as is known in the art. The keypad 714 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The mobile computing arrangement 700 may also include a digital signal processor (DSP) 720. The DSP 720 may perform a variety of functions, including analog-to-digital (A/D) conversion, digital-to-analog (D/A) conversion, speech coding/decoding, encryption/decryption, error detection and correction, bit stream translation, filtering, etc. The transceiver 722, generally coupled to an antenna 724, may transmit and receive the radio signals associated with a wireless device.

The mobile computing arrangement 700 of FIG. 9 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 706 and associated features, and data 708, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to devices which are non-mobile terminals, i.e., landline computing systems.

Figure 10:
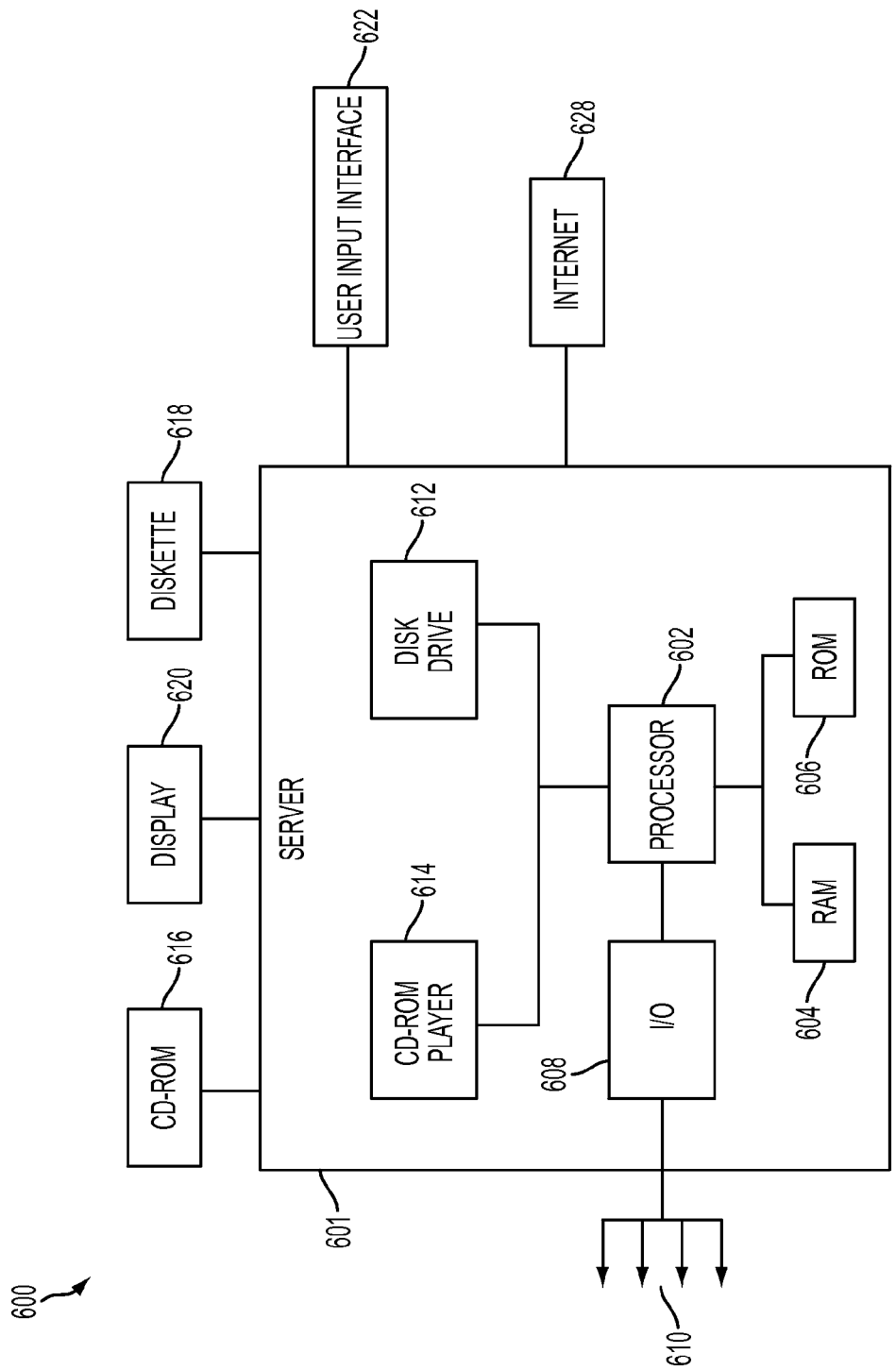
FIG. 10 illustrates an exemplary server device which can be used in conjunction with exemplary embodiments.

An example of a representative computing system capable of carrying out operations in accordance with the servers or gateways of the exemplary embodiments is illustrated in FIG. 10. Hardware, firmware, software or a combination thereof may be used to perform the various steps and operations described herein. The computing structure 600 of FIG. 10 is an exemplary computing structure that may be used in connection with such a system.

The exemplary computing arrangement 600 suitable for performing the activities described in the exemplary embodiments may include server 601, which may correspond to any of servers or gateways described herein, e.g., PN AS 46 or gateway 30. Such a server 601 may include a central processor (CPU) 602 coupled to a random access memory (RAM) 604 and to a read-only memory (ROM) 606. The ROM 606 may also be other types of storage media to store programs, such as programmable ROM (PROM), erasable PROM (EPROM), etc. The processor 602 may communicate with other internal and external components through input/output (I/O) circuitry 608 and bussing 610, to provide control signals and the like. The processor 602 carries out a variety of functions as is known in the art, as dictated by software and/or firmware instructions. For example, when computing arrangement 600 is operating as a PN Cluster gateway 30, the I/O circuitry 608 and bussing 610 can provide at least two network connections, i.e., one for the PN Cluster network, and one for the wide-area network.

The server 601 may also include one or more data storage devices, including hard and floppy disk drives 612, CD-ROM drives 614, and other hardware capable of reading and/or storing information such as DVD, etc. In one embodiment, software for carrying out the above discussed steps, e.g., to establish friend relations between networked objects, may be stored and distributed on a CD-ROM 616, diskette 618 or other form of media capable of portably storing information. These storage media may be inserted into, and read by, devices such as the CD-ROM drive 614, the disk drive 612, etc. The server 601 may be coupled to a display 620, which may be any type of known display or presentation screen, such as LCD displays, plasma display, cathode ray tubes (CRT), etc. A user input interface 622 is provided, including one or more user interface mechanisms such as a mouse, keyboard, microphone, touch pad, touch screen, voice-recognition system, etc.

The server 601 may be coupled to other computing devices, such as the landline and/or wireless terminals and associated watcher applications, via a network. The server may be part of a larger network configuration as in a global area network (GAN) such as the Internet 628, which allows ultimate connection to the entities described above.

Figure 11:
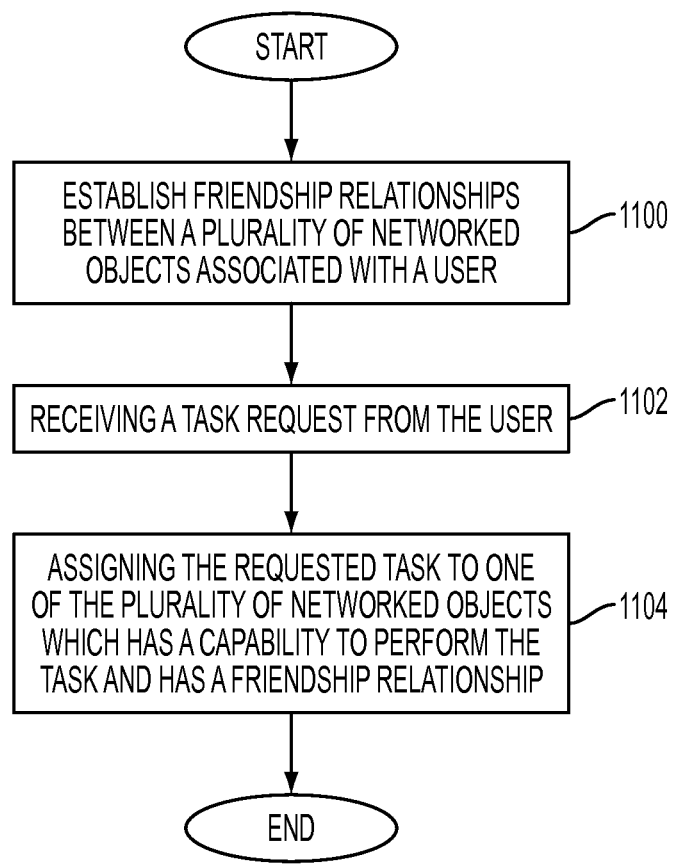
FIG. 11 is a flowchart depicting a method for managing networked objects according to an exemplary embodiment.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor. For example, FIG. 11 depicts a flowchart which illustrates a method of managing networked objects according to an exemplary embodiment. Therein, at step 1100, friendship relationships are established between a plurality of networked objects, each of the plurality of networked objects being associated with a user. The network management system receives a task request at step 1102. In response, the network management system assigns the requested task to one of the plurality of networked objects which has a capability to perform the requested task and which has an established friendship relationship with the user.

Figure 12:
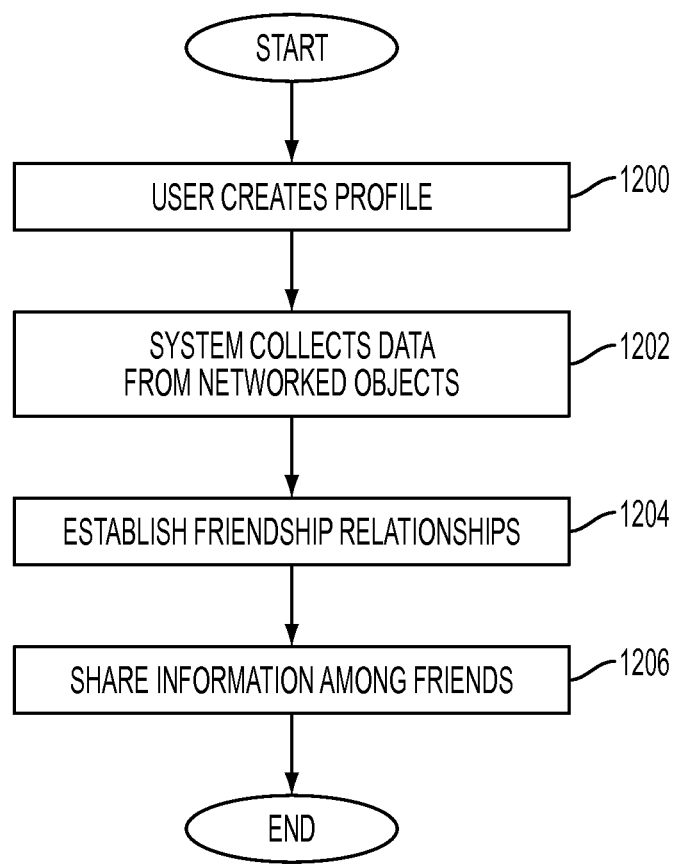
FIG. 12 is a flowchart depicting another method for managing networked objects according to an exemplary embodiment.

According to another exemplary embodiment, generalized systems and methods for networking objects using social mapping principles can operate as shown in the flowchart of FIG. 12. Therein, at step 1200, a user joins and installs the service and creates a profile that reflects the identity of the user. Data for the user profiles could be imported or aggregated from existing user profiles of known web-based social network services such as Facebook, MySpace, and LinkedIn, or from the users' data connected to a subscription with an operator. Groups of users could be created among users living within the same household, or other attributes that the user has decided to share. User profiles can be made visible and linked with the profiles of other users of a group if the users wish to do so.

At step 1202, the system collects data from objects which are presently networked together and unique entity profiles for each device are created (based on, for example, the kind of device, its functionality, brand characteristics, location, etc.). The users connect their own system entity to system entities of networked objects, for example by creating a connection through the client application user interface or physically bringing together NFC/RFID enabled devices. The objects' system entities connect to each other's profiles, i.e., establish a level of friendship relation as described above, either automatically (based on the kind of device, its functionality, brand, location, etc.) or as managed by a user (authorized to do so and that has connected his/her user profile to the device) at step 1204.

Once System Entity A has established a friendship relation with System Entity B, other system entities that System Entity A already has a relation to can also establish a relation with System Entity B, and vice versa. For example, suppose that the system sends data about the new relation to already connected system entities associated with both A and B, optionally filtered by criteria such as device capabilities, brand, location etc. The new system entity (A or B in this example) can respond to such queries e.g. by auto-confirmation, thereby establishing a relation to the existing devices. Alternatively, all such connections can be manually managed in the user's client application, or the user could define a set of rules for auto-confirmation.

As mentioned above, such relations may have a temporal characteristic or parameter. For example, temporary relations to system entities such as those associated with borrowed or rented networked objects, or guest-users can be set up for a specific period of time, alternatively based on the proximity of another specific user, within a certain area, along a certain route or other criteria. The temporary connected entities will then only be available when fulfilling the pre-defined criteria mentioned above, and the system entity is otherwise inaccessible, although it may still be visible to the temporary connected system entities. A temporary connection can be approved- or initiated by the system or by the owner/provider/administrator of the system entity that will have a temporal connection.

Connected users and objects' system entities according to exemplary embodiments may have reciprocal presence in each other's profiles. Information about status, logged activities, other connections, mutual connections etc. can be made available for connected users and system entities. The user, or a networked object's system entity, can for example send data or a notification that calls for a certain response, to the system or to a specific system entity or group of system entities.

Each system entity can be made aware of its connected system entities profiles, including but not limited to data about their functionality, dependencies, current status as well as previous and future planned (timer set) events, capabilities, mandate and responsibilities. This enables functionality and interaction such as that exemplified by the TV and the video recorder scenario described above. Moreover, the kind of subcontracting, functional outsourcing or 'favors' described in that TV and video recorder example could, in some cases, be executed automatically between the system entities of objects, without the interaction of a user. These activities are collectively referred to in FIG. 12 by step 1206 which indicates that all of this type of information can be shared among those networked objects 10 which are, at least, friends with one another.

As yet another example of this type of architecture and functionality according to an exemplary embodiment, consider a sensor cluster represented in the system as a plant's system entity sends data to the system about its status, for example that it the temperature is high and humidity very low. The system could interpret this status as not ideal for the plant, and the system could notify the system entity of the blinds in the window where the plant is located that it could potentially provide a solution to this reported problem by closing, creating shadow for the plant. After closing, the blinds will send a notification (as a threaded response to the plant's status) that states that it has attempted to solve the plant's problem. The user can monitor, participate or intervene with the interaction between the system entities via the user interface.

From the foregoing, it will be apparent that exemplary embodiments provide intuitive, understandable and unified interaction with networked devices and services as well as between their users, owners, manufacturers, vendors or providers. Such embodiments support and enhance the users' conceptual understanding of a digital network, as well as provide easy access to each device and service via a user interface. Exemplary embodiments greatly ease the configuration, monitoring, maintenance and management of networked products and services and can also help make home automation more intelligent and transparent, but at the same time understandable and non-intrusive for the users.

The ease of use, accessibility and understandable concept according to these exemplary embodiments could lower the threshold for the users to buy add services to the system. This could create a new platform for delivering digital as well as physical services of all kinds. The system also opens up new opportunities for branding as it provides a way for manufacturers of products and services to manage and customize the characteristics that define the system entities that represent each product they manufacture in the system.

Manufacturers can submit data to the system that for example define what kind of expression and behavior system entities of a certain product should have, and also what kind of relationship it should have with other system entities that are related to or affiliated via the brand of their manufacturers.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items. Additionally, the term "user" is meant to be inclusive of an individual, a group and an organization.

The invention claimed is:

1. A method for managing networked objects comprising:
   establishing, by a network management system, friendship relationships between a plurality of said networked objects, each of said plurality of networked objects being associated with a user;
   receiving, at said network management system, a task request; and
   assigning, by said network management system, said requested task to one of said plurality of networked objects which has a capability to perform said requested task and which has an established friendship relationship with said user,
   wherein said step of assigning is performed automatically by said network management system without interaction of user,
   wherein when said plurality of networked objects, associated with said user, does not include a networked object capable of performing said requested task, transmitting, by said network management system, said task request to another network associated with a different user and having a networked object which has a friend relationship with said network management system and which has said capability to perform said requested task,
   wherein said networked objects are devices.

2. The method of claim 1, wherein said step of establishing said friendship relationships further comprises:
   discovering, by said network management system, a networked object when said networked object is set up in an area associated with said user;
   sending, by said network management system, a request to said user to authorize said discovered networked object as a friend of said user; and
   storing, by said network management system, a friendship relationship associated with said discovered networked object based on a response to said request.

3. The method of claim 1, wherein said friendship relationship is temporary.

4. The method of claim 1, wherein said friendship relationship is permanent.

5. The method of claim 1, wherein said step of receiving said task request from said user further comprises:
   receiving, by said network management system, said task request from a first one of said plurality of networked objects which has a friendship relationship with said user but which does not have said capability to perform said requested task.

6. The method of claim 5, wherein said step of assigning further comprises:
   identifying, by said network management system, a second one of said plurality of networked objects which has a friendship relationship with said user and which does have said capability to perform said requested task; and
   sending a signal to said second one of said plurality of networked objects that instructs said second one of said plurality of networked objects to perform said requested task.

7. The method of claim 1, further comprising:
   storing a plurality of system entity profiles for each of said plurality of networked objects which has a friendship relationship with said user, said system entity profiles including an address for a respective networked object, an indicator of a level of access of said respective networked object with said user, and information associated with at least one capability of said respective networked object.

8. The method of claim 7, wherein said information associated with said at least one capability of said respective networked object further comprises:
   at least one data element indicating a type of data format or function which said respective networked object can process.

9. A management device which manages a plurality of networked objects based on friendship relationships with a user comprising:
   a memory device configured to store a plurality of system entity profiles for each of said plurality of networked objects which has a friendship relationship with said user, said system entity profiles including an address for a respective networked object, an indicator of a level of access of said respective networked object with said user, and information associated with at least one capability of said respective networked object;
   an interface configured to receive task requests either directly from said user or via one of said plurality of networked objects; and
   a processor configured to assign said requested tasks to one or more of said plurality of networked objects which have a friendship relationship with said user based on said stored system entity profiles,
   wherein said management device assigns requested tasks automatically without interaction of said user,
   wherein when said plurality of networked objects, associated with said user, does not include a networked object capable of performing at least one of said task requests, said management device transmits said at least one of said task requests to another network, associated with a different user and having a networked object which has a friend relationship with said management device and which has said capability to perform said at least one of said requested tasks,
   wherein said networked objects are devices.

10. The management device of claim 9, wherein said memory device is further configured to store:
    a device capability database which includes information regarding media that each of said plurality of networked objects is capable of processing;
    a service required capabilities database which includes information regarding functions used to perform said task requests;
    an availability database which includes information regarding which of said plurality of networked objects and services are available in specific user situations; and
    a status database which includes information regarding a current status of each of said plurality of networked objects.

11. The management device of claim 9, wherein said processor is further configured to discover a networked object when said networked object is set up in an area associated with said user, to send a request to said user to authorize said discovered networked object as a friend of said user, and to store a friendship relationship associated with said discovered networked object based on a response to said request in said memory device.

12. The management device of claim 9, wherein said interface is further configured to receive said task request from a first one of said plurality of networked objects which has a friendship relationship with said user but which does not have a capability to perform said requested task.

13. The management device of claim 12, wherein said processor is further configured to identify a second one of said plurality of networked objects which has a friendship relationship with said user and which does have said capability to perform said requested task, and to send a signal to said second one of said plurality of networked objects that instructs said second one of said plurality of networked objects to perform said requested task.

14. The management device of claim 9, wherein said information associated with said at least one capability of said respective networked object further comprises:
   at least one data element indicating a type of data format or function which said respective networked object can process.

15. A system for managing networked objects comprising:
   a plurality of networked objects, each capable of performing at least one task;
   a gateway (GW) connected to each of said plurality of networked objects for sending task requests to and receiving task requests from, said plurality of networked objects; and
   an application server (AS) connected to said GW, which AS manages friendship relationships among said plurality of networked objects and coordinates management of said task requests based upon said friendship relationships,
   wherein said AS coordinates said task requests automatically without the interaction of said user,
   wherein when said plurality of networked objects, associated with said user, does not include a networked object capable of performing at least one of said task requests, said at least one of said task requests is transmitted to another network, associated with a different user and having a networked object which has a friend relationship with said AS and which has said capability to perform said at least one of said requested tasks,
   wherein said networked objects are devices.

16. The system of claim 15, wherein said AS further comprises:
   a device capability database which includes information regarding media that each of said plurality of networked objects is capable of processing;
   a service required capabilities database which includes information regarding functions used to perform said task requests;
   an availability database which includes information regarding which of said plurality of networked objects and services are available in specific user situations; and
   a status database which includes information regarding a current status of each of said plurality of networked objects.

17. The method of claim 1, wherein said established friendship relationship is one of:
   a best friend descriptor, wherein said user has a highest level of access rights but no administrative rights with respect to said one of said plurality of networked objects; and
   a friend descriptor, wherein said user has a lower level of access rights to said one of said plurality of networked objects than said user would have if said friendship relationship was said best friend but which enables said one of said plurality of networked objects to accept said requested task without further authorization from said network management system.

18. The management device of claim 9, wherein said friendship relationship is one of:
   a best friend descriptor, wherein said user has a highest level of access rights but no administrative rights with respect to a respective one of said plurality of networked objects; and
   a friend descriptor, wherein said user has a lower level of access rights to a respective one of said plurality of networked objects than said user would have if said friendship relationship was said best friend but which enables said respective one of said plurality of networked objects to accept a requested task without further authorization from said management device.

19. The system of claim 15, wherein said friendship relationships include:
   a best friend descriptor, wherein said user has a highest level of access rights but no administrative rights with respect to a respective one of said plurality of networked objects; and
   a friend descriptor, wherein said user has a lower level of access rights to a respective one of said plurality of networked objects than said user would have if said friendship relationship was said best friend but which enables said respective one of said plurality of networked objects to accept a requested task without further authorization from said AS.

* * * * *